US009538539B2

(12) United States Patent
Rajamani et al.

(10) Patent No.: US 9,538,539 B2
(45) Date of Patent: Jan. 3, 2017

(54) APPARATUS, SYSTEM AND METHOD OF CHANNEL SWITCHING

(71) Applicant: INTEL CORPORATION, Santa Clara, CA (US)

(72) Inventors: Krishnan Rajamani, San Diego, CA (US); Jie Gao, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 89 days.

(21) Appl. No.: 14/582,927

(22) Filed: Dec. 24, 2014

(65) Prior Publication Data
US 2016/0192343 A1 Jun. 30, 2016

(51) Int. Cl.
*H04W 72/04* (2009.01)
*H04W 48/08* (2009.01)

(52) U.S. Cl.
CPC ........... *H04W 72/048* (2013.01); *H04W 48/08* (2013.01)

(58) Field of Classification Search
CPC ..................... H04W 72/048; H04W 48/08
USPC .................................................. 370/328, 329
See application file for complete search history.

(56) References Cited

U.S. PATENT DOCUMENTS

| 2012/0026997 A1* | 2/2012 | Seok | H04L 5/001 370/338 |
| 2012/0166671 A1* | 6/2012 | Qi | H04L 45/64 709/236 |
| 2013/0143542 A1* | 6/2013 | Kovvali | H04W 48/18 455/418 |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
Wi-Fi Alliance Technical Committee P2P Task Group; Wi-Fi Peer-to-Peer (P2P) Technical Specification; Version 1.2; Dec. 14, 2011; 160 pages.

* cited by examiner

*Primary Examiner* — Ronald B Abelson
(74) *Attorney, Agent, or Firm* — Shichrur & Co.

(57) ABSTRACT

Some demonstrative embodiments include apparatuses, devices, systems and methods of channel switching. For example, a Peer to Peer (P2P) client device may include a radio to transmit a request to a P2P Group Owner (GO) via a first wireless communication channel, the request including a request to switch to a second wireless communication channel, the radio to receive from the P2P GO a response in response to the request; and a controller to, based on the response, switch the radio to the second wireless communication channel to communicate with the P2P GO.

24 Claims, 5 Drawing Sheets

APPARATUS, SYSTEM AND METHOD OF CHANNEL SWITCHING

TECHNICAL FIELD

Embodiments described herein generally relate to channel switching.

BACKGROUND

A wireless computing device, e.g., a personal computer (PC), a Smartphone, a Tablet, and/or the like, may communicate with a wireless display via a first wireless channel to display content on the wireless display.

The wireless computing device may communicate with an access point via a second wireless channel, e.g., in addition to the communication with the wireless display, for example, to gain access to the Internet.

Communicating via two different wireless communication channels, e.g., using a Different Channel Mode (DCM), may require channel switching between the different wireless communication channels and/or using a time sharing mechanism to enable communication via the different wireless communication channels, which may reduce performance of the wireless computing device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
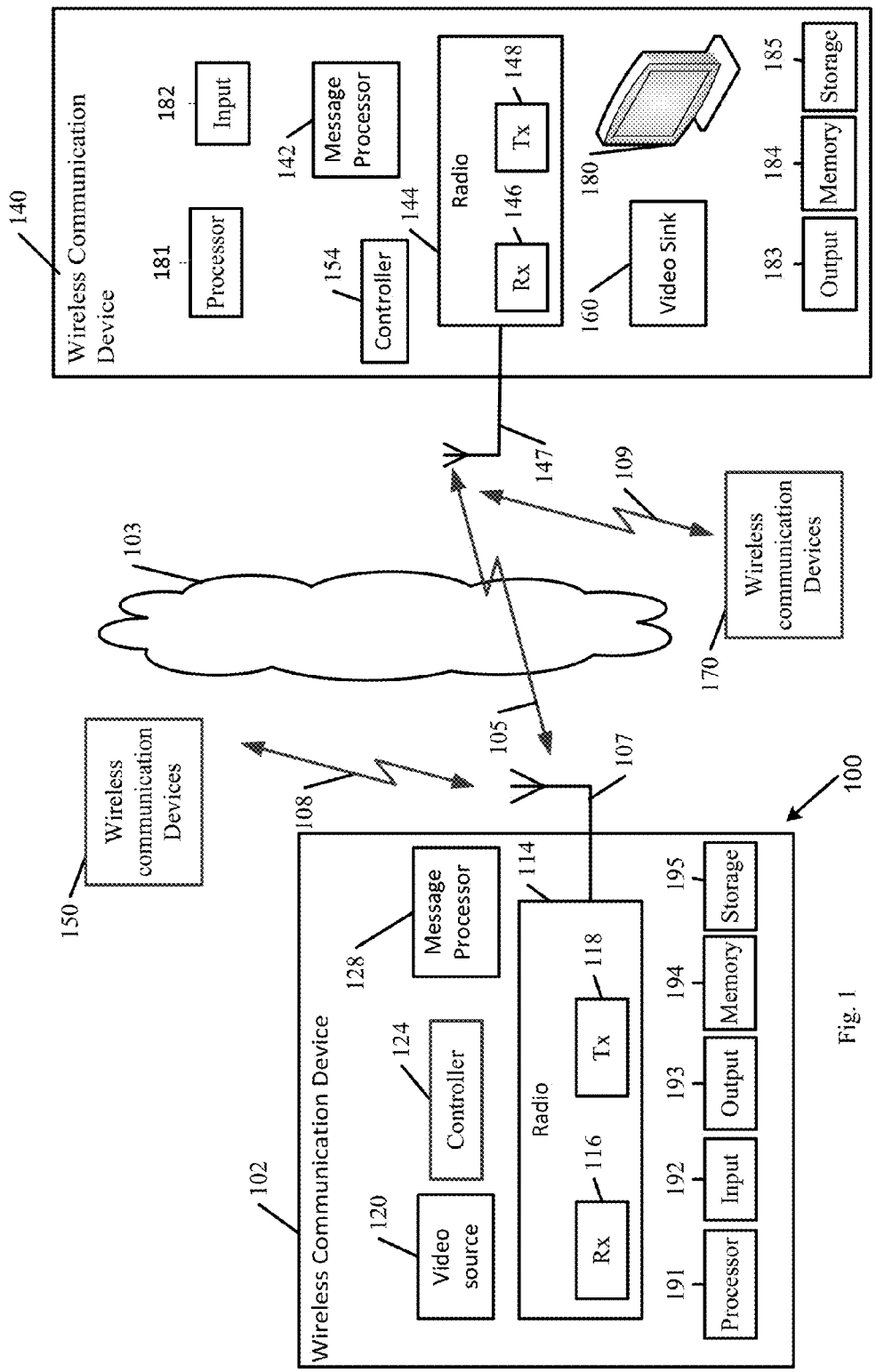
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Bluetooth device, an Internet of Things (IoT) device, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11ac-2013 ("IEEE P802.11ac-2013, IEEE Standard for Information Technology—Telecommunications and Information Exchange Between Systems—Local and Metropolitan Area Networks Specific Requirements—Part 11: Wireless LAN Medium Access Control (MAC) and Physical Layer (PHY) Specifications—Amendment 4: Enhancements for Very High Throughput for Operation in Bands below 6 GHz"*, December, 2013); *IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3:*

Enhancements for Very High Throughput in the 60 GHz Band", 28 Dec., 2012); IEEE 802.11Revmc; IEEE 802.11x)) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version 1.2, 2012*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing WirelessHD™ specifications and/or future versions and/or derivatives thereof, units and/or devices which are part of the above networks, devices and/or networks operating in accordance with existing Intel Wireless Display (WiDi) specifications and/or future versions and/or derivatives thereof, devices and/or networks operating in accordance with existing Miracast™ specifications and/or future versions and/or derivatives thereof, units and/ or devices which are part of the above networks, and the like.

Some embodiments may be used in conjunction with one way and/or two-way radio communication systems, a Miracast Device, a WiDi device, a Miracast sink, a Miracast source, a wireless display device, a video source, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/ receive elements. The antenna may include, for example, a phased array antenna, a single element antenna, a set of switched beam antennas, and/or the like.

The term "station" (STA), as used herein, may include any logical entity that is at least one addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The phrase "Peer-to-peer" (P2P) network, as used herein, may relate to a network in which a STA in the network can operate as a client or as a server for another STA in the network. The P2P network may allow shared access to resources, e.g., without a need for a central server.

The phrase "P2P device", as used herein, may relate to a WFA P2P device that may be capable of acting as both a P2P Group Owner and a P2P Client.

The phrase "P2P Client", as used herein, may relate to a P2P device that may be connected to a P2P Group Owner.

The phrase "P2P Group owner", as used herein, may relate to an "AP-like" entity, when referring to non-DMG networks, or to a PCP, when referring to DMG networks that may provide and use connectivity between clients.

The phrase "P2P Group", as used herein, may relate to a set of devices including one P2P Group Owner and zero or more P2P Clients.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information, audio, video, and/or signals via a wireless medium (WM) 103. For example, system 100 may include a wireless communication device 102, a wireless communication device 140, one or more wireless communication devices 150, and/or one or more wireless communication devices 170.

In some demonstrative embodiments, wireless communication device 102 may include a video source device.

In some demonstrative embodiments, wireless communication device 102 may include a video source 120.

In some demonstrative embodiments, video source 120 may include a Miracast video source, a Wireless Display (WiDi) video source, or any other video source.

In some demonstrative embodiments, wireless communication device 140 may include a wireless display device.

In some demonstrative embodiments, wireless communication device 140 may include a video sink 160 to receive content from video source 120 via WM 103.

In some demonstrative embodiments, video sink 160 may include a Miracast sink, a Wireless Display (WiDi) sink, or any other video sink.

In some demonstrative embodiments, wireless communication device 140 may include a display device 180 to display the content, e.g., received via video sink 160.

In some demonstrative embodiments, display device 180 may include a television (TV), an LCD screen, a LED screen, or the like.

In some demonstrative embodiments, display device 180 and video sink 160 may be part of device 140.

In one example, device 140 may include a wireless display device having an embedded screen and a video sink module and/or capabilities.

In other embodiments, at least one of display device 180 and video sink 160 may not be part of device 140.

In one example, video sink 160 may not be part of device 140. For example, device 140 may include a TV, and video sink 160 may include a box or a plug attached to the TV, configured to provide video sink capabilities to the TV.

In another example, display device 180 may not be part of device 140. For example, display device 180 may include a TV, which does not have wireless capabilities, and device 140 may include a box or a plug attached to the TV, configured to provide video sink and/or wireless capabilities to the TV.

In some demonstrative embodiments, device 102 may include a mobile or portable device.

In other embodiments, device 102 may include a non-mobile or a static device.

In some demonstrative embodiments, wireless communication device 102, may include, for example, a PC, a desktop computer, a mobile computer, a laptop computer, a User Equipment (UE), an Internet of Things (IoT) device, a notebook computer, a tablet computer, an Ultrabook™ computer, a mobile internet device, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, a video sink, a stereo tuner, a flat panel display, a Personal Media Player (PMP), a digital video camera (DVC), a gaming device, a Digital Still camera (DSC), a media player, a Smartphone, a television, or the like.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD)

display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, system 100 may include one or more P2P networks.

In some demonstrative embodiments, devices 102 and 140 may be part of a P2P network 105. For example, device 102 may perform the functionality of a P2P client device and/or device 140 may perform the functionality of a P2P GO.

In other embodiments, system 100 may include any other P2P networks.

In some demonstrative embodiments, system 100 may include one or more wireless communication networks.

In one example, the wireless communication networks may include WLAN networks.

In some demonstrative embodiments, devices 102 and 150 may be part of a wireless communication network 108.

In some demonstrative embodiments, devices 140 and 170 may be part of a wireless communication network 109.

In other embodiments, system 100 may include any other wireless communication networks.

In some demonstrative embodiments, devices 102 and 140 may include one or more radios to perform wireless communication between devices 102, 140, 150, 170 and/or one or more other wireless communication devices. For example, device 102 may include at least one radio 114, and/or device 140 may include at least one radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, radio 114 may be configured to communicate with device 140 over P2P network 105.

In some demonstrative embodiments, radio 114 may communicate with device 140 over P2P network 105, for example, to stream from video source 120 to video sink 160 content to be displayed on display device 180.

In some demonstrative embodiments, radio 114 may be configured to communicate with devices 150 over wireless communication network 108.

In some demonstrative embodiments, radio 114 may communicate with devices 150 over wireless communication network 108, for example, to gain access to one or more network resources, e.g., the Internet, and/or to receive one or more services from devices 150, e.g., file sharing services, printing services, and/or the like.

In some demonstrative embodiments, device 140 may communicate with devices 170 over wireless communication network 109 via a first wireless communication channel.

In some demonstrative embodiments, device 102 may communicate with devices 150 over wireless communication network 108 via a second wireless communication channel.

In some demonstrative embodiments, device 102 may establish a P2P connection between devices 102 and 140, e.g., to communicate over P2P network 105.

In some demonstrative embodiments, devices 102 and 140 may establish the P2P connection to stream from video source 120 to video sink 160 media content to be displayed on display device 180.

In some demonstrative embodiments, devices 102 and 140 may communicate over the P2P connection via the first wireless communication channel, for example, if device 140 is the GO of P2P network 105, and device 140 is using the first wireless communication channel to communicate with devices 170, e.g., as described above.

In some demonstrative embodiments, radio 114 may communicate with devices 150, and device 140 using two different wireless channels. For example, radio 114 may communicate with device 140 via the first wireless communication channel and with devices 150 via the second wireless communication channel, e.g., as described above.

In some demonstrative embodiments, device 102 may communicate with devices 150 and device 140 using the two different channels, for example, if device 140 performs the functionality of the P2P GO.

In one example, device 102 may communicate with devices 150 via a first channel, and device 140 as the P2P GO may choose to communicate via a second channel.

In another example, device 140 may include a projector in a conference room equipped with many APs in a communication range from the projector. According to this example, there is a high probability that device 102 and device 140 may not use the same channel, and/or device 140 may switch and/or roam to a different channel, e.g., different from a channel used by device 102.

In some demonstrative embodiments, radio 114 may communicate at the DCM.

In some demonstrative embodiments, the DCM may include a mode, in which radio 114 may communicate with the one or more wireless communication devices 150 and with device 140 via different wireless communication channels.

For example, the DCM may include a mode, in which radio 114 is to communicate with the one or more wireless communication devices 150 via the second wireless communication channel, and to communicate with device 140 via the first wireless communication channel.

In some demonstrative embodiments, communicating at the DCM may reduce performance of device 102.

In one example, communicating at the DCM may require channel switching between the different wireless communication channels and/or using a time-sharing mechanism to enable communication via the different wireless communication channels.

In some demonstrative embodiments, radio 114 may be configured to communicate at a Same Channel Mode (SCM) or at the Different Channel Mode (DCM).

In some demonstrative embodiments, the SCM may include a mode, in which radio 114 may communicate via the same wireless communication channel with the one or more wireless communication devices 150 and with device 140.

For example, the SCM may include a mode, in which radio 114 may communicate with devices 150 and device 140 via the second wireless communication channel.

In some demonstrative embodiments, radio 114 may improve performance when operating at the SCM, for example, compared to the DCM.

In one example, when communicates at the SCM, radio 114 may not switch between the different wireless communication channels and/or may not utilize time sharing algorithms and/or mechanisms to maintain high-performance communication via the different wireless communication channels. Accordingly, it may be beneficial to use the SCM instead of the DCM.

In some demonstrative embodiments, device 102 may not be able to operate at the SCM mode, for example, if device 140 performs the functionality of the P2P GO and communicates via the first wireless communication channel, e.g., as described above.

Some demonstrative embodiments may enable device 102 to trigger device 140 to switch to the second wireless communication channel, which may enable device 102 to communicate at the SCM.

In some demonstrative embodiments, forcing device 140, e.g., by device 102, to communicate over the second wireless communication channel during the establishment of the P2P connection, e.g., during GO negotiation, may not be efficient.

In one example, forcing device 140 to communicate over the second wireless communication channel during the establishment of the P2P connection may be inefficient, for example, if devices 102 and 140 use an automatic GO mechanism, which eliminates GO negotiation.

In another example, forcing device 140 to communicate over the second wireless communication channel during the establishment of the P2P connection may be inefficient, for example, if device 140 switches to another wireless communication channel after the establishment of the P2P connection.

In some demonstrative embodiments, sending to device 140, e.g., from device 102, an identification of wireless communication network 108, in which device 102 communicates with devices 150 over the second wireless communication channel, to request device 140 to switch to the second wireless communication channel, may not be efficient.

In one example, device 140 may not know that the second wireless communication channel is associated with wireless communication network 108, and/or may be required to scan all wireless communication channel to find wireless communication network 108.

In another example, sending the indication of wireless communication network 108 to device 140 may not be efficient, e.g., if device 102 operates at the DCM.

In some demonstrative embodiments, switching radio 114 to communicate with devices 150 over wireless communication network 108 via the first wireless communication channel may not be efficient, for example, if device 102 does not discover a device of devices 150 at the first wireless communication channel and/or at a required range, e.g., to establish the P2P connection.

In some demonstrative embodiments, device 102 may include a controller 124 configured to switch between the first wireless communication channel and the second wireless communication channel.

In some demonstrative embodiments, controller 124 may be configured to trigger device 140 to switch between the first wireless communication channel and the second wireless communication channel, e.g., as described below.

In some demonstrative embodiments, device 140 may include a controller 154 configured to switch between the first wireless communication channel and the second wireless communication channel.

In some demonstrative embodiments, controllers 124 and/or 154 may include circuitry, e.g., processor circuitry, memory circuitry, Media-Access Control (MAC) circuitry, Physical Layer (PHY) circuitry, and/or any other circuitry, configured to perform the functionality of controllers 124 and/or 154. Additionally or alternatively, one or more functionalities of controllers 124 and/or 154 may be implemented by logic, which may be executed by a machine and/or one or more processors, e.g., as described below.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 142 configured to generate, process and/or access one or messages communicated by device 140.

In one example, message processor 142 may be configured to generate one or more messages to be transmitted by device 140, and/or message processor 142 may be configured to access and/or to process one or more messages received by device 140, e.g., as described below.

In some demonstrative embodiments, message processors 128 and/or 142 may include circuitry, e.g., processor circuitry, memory circuitry, Media-Access Control (MAC) circuitry, Physical Layer (PHY) circuitry, and/or any other circuitry, configured to perform the functionality of message processors 128 and/or 142. Additionally or alternatively, one or more functionalities of the proximity estimators message processors 128 and/or 142 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 142 may be implemented as part of radio 144.

In some demonstrative embodiments, at least part of the functionality of message processor 128 may be implemented as part of controller 124, and/or at least part of the functionality of message processor 142 may be implemented as part of controller 154.

In other embodiments, the functionality of message processor 128 may be implemented as part of any other element of device 102, and/or the functionality of message processor 142 may be implemented as part of any other element of device 140.

In some demonstrative embodiments, radio 114 may transmit a request 113 to device 140 via the first wireless communication channel.

In some demonstrative embodiments, request 113 may include a request to switch to the second wireless communication channel ("the channel switch request").

In one example, message processor 128 may generate request 113 and controller 124 may determine a content of request 113, for example, a specific wireless communication channel to switch to, e.g., the second wireless communication channel.

In some demonstrative embodiments, request 113 may include a request to initiate an Extended Channel Switch (ECS) procedure.

In some demonstrative embodiments, controller 124 may cause radio 114 to transmit request 113, based on a comparison between a performance of radio 114 when operating at the SCM and when operating at the DCM.

In some demonstrative embodiments, the comparison may include a comparison between one or more quality parameters and/or criteria.

In one example, the parameters may include latency and/or throughput-sensitive content.

In another example, the criteria may include a reduction in performance when communicating at the DCM. The criteria may be measured by one or more parameters, e.g., a DCM duty cycle, a dwell-time, a modulation and coding scheme (MCS), a channel load, an End to End (E2E) latency, and/or the like.

In another example, controller 124 may control radio 114 to transmit request 113, for example, when radio 114 is using DCM.

In another example, controller 124 may control radio 114 to transmit request 113 based on any other criterion, parameter, and/or mechanism.

In some demonstrative embodiments, radio 144 may receive request 113 via the first wireless communication channel.

In some demonstrative embodiments, controller 154 may determine whether or not to accept the channel switch request.

In one example, controller 154 may determine whether or not to accept the channel switch request, for example, based on an amount of communication between device 140 and devices 170 via the first wireless communication channel.

In another example, controller 154 may determine whether or not to accept the channel switch request, for example, based on any other criteria.

In some demonstrative embodiments, radio 144 may send to device 102 a response 115 via the first wireless communication channel, e.g., in response to request 113.

In some demonstrative embodiments, response 115 may indicate whether or not the channel switch request is accepted.

In some demonstrative embodiments, message processor 134 may generate response 115, and controller 154 may determine a content of response 115, e.g., an indication whether or not the channel switch request is accepted.

In some demonstrative embodiments, controller 154 may initiate an Extended Channel Switch (ECS) procedure to switch radio 144 to the second wireless communication channel, for example, if the channel switch request is accepted In some demonstrative embodiments, radio 114 may receive response 115 via the first wireless communication channel.

In some demonstrative embodiments, controller 124 may switch radio 114 to the second wireless communication channel to communicate with device 140, e.g., based on response 115.

In some demonstrative embodiments, controller 124 may switch radio 114 to the second wireless communication channel, for example, if the response indicates the request is accepted.

In some demonstrative embodiments, controller 154 may switch radio 144 to communicate with the one or more wireless communication devices 170 via the second wireless communication channel, for example, if the request is accepted.

In one example, controller 154 may initiate an ECS procedure between device 140 and devices 170, for example, to communicate with devices 170 via the second wireless communication channel.

In some demonstrative embodiments, controller 154 may not accept the channel switch request.

In some demonstrative embodiments, controller 154 may notify device 102 of a wireless communication network, which may enable device 102 to operate at the SCM.

In some demonstrative embodiments, response 115 may include an identifier of wireless communication network 109, which uses the first wireless communication channel, for example, if the channel switch request is not accepted.

In some demonstrative embodiments, the identifier may include a Basic Service Set Identification (BSSID) of wireless communication network 109.

In some demonstrative embodiments, device 102 may receive response 115 including the identifier, e.g., the BSSID of wireless communication network 109.

In some demonstrative embodiments, controller 124 may control radio 114 to switch to communicate over wireless communication network 109, for example, if the channel switch request is not accepted.

In some demonstrative embodiments, request 113 may be included in an Information Element (IE) of a probe request frame.

In some demonstrative embodiments, response 115 may be included in an IE of a probe response frame.

In one example, request 113 may be encapsulated as an additional subelement in the Miracast WiFi Direct (WFD) IE of the probe request, and/or response 115 may be encapsulated as an additional subelement in the Miracast WFD IE of the probe response.

In some demonstrative embodiments, at least one message of request 113 and response 115 may be included in at least one IE of a P2P action frame.

In one example, at least one message of request 113 and response 115 may be included in at least one IE of a vendor specific action frame.

In another example, at least one message of request 113 and response 115 may be included in at least one IE of a newly defined action frame or a P2P public action frame.

In some demonstrative embodiments, at least one message of request 113 and response 115 may be included as part of at least one dedicated frame to manage the channel switch request.

In some demonstrative embodiments, at least one message of request 113 and response 115 may be included as part of at least one message communicated between video source 120 and video sink 160.

In one example, request 113 may be included as part of a Real Time Streaming Protocol (RTSP) SET PARAMETER request construct, and/or response 115 may be included as part of a RTSP SET PARAMETER response construct. The RTSP SET PARAMETER request construct and/or RTSP SET PARAMETER response construct may include vendor specific messages or may be part of the Miracast Specification.

In some demonstrative embodiments, at least one message of request 113 and response 115 may be included as part of at least one message communicated between video source 120 and video sink 160, for example, via a separate Transmission Control Protocol (TCP) connection, e.g., independent of the P2P connection.

In some demonstrative embodiments, video source 120 and/or video sink 160 may coordinate communication of request 113 and/or response 115 with radios 114 and/or 144, respectively, for example, if at least one message of request 113 and response 115 is included as part of at least one message communicated between video source 120 and video sink 160, e.g., as described below with reference to FIG. 3.

In some demonstrative embodiments, request 113 and response 115 may provide a mechanism, which may enable device 102 to communicate at the SCM, e.g., as described above.

In some demonstrative embodiments, communicating at the SCM may improve performance of device 102, e.g., as describe above.

Figure 2:
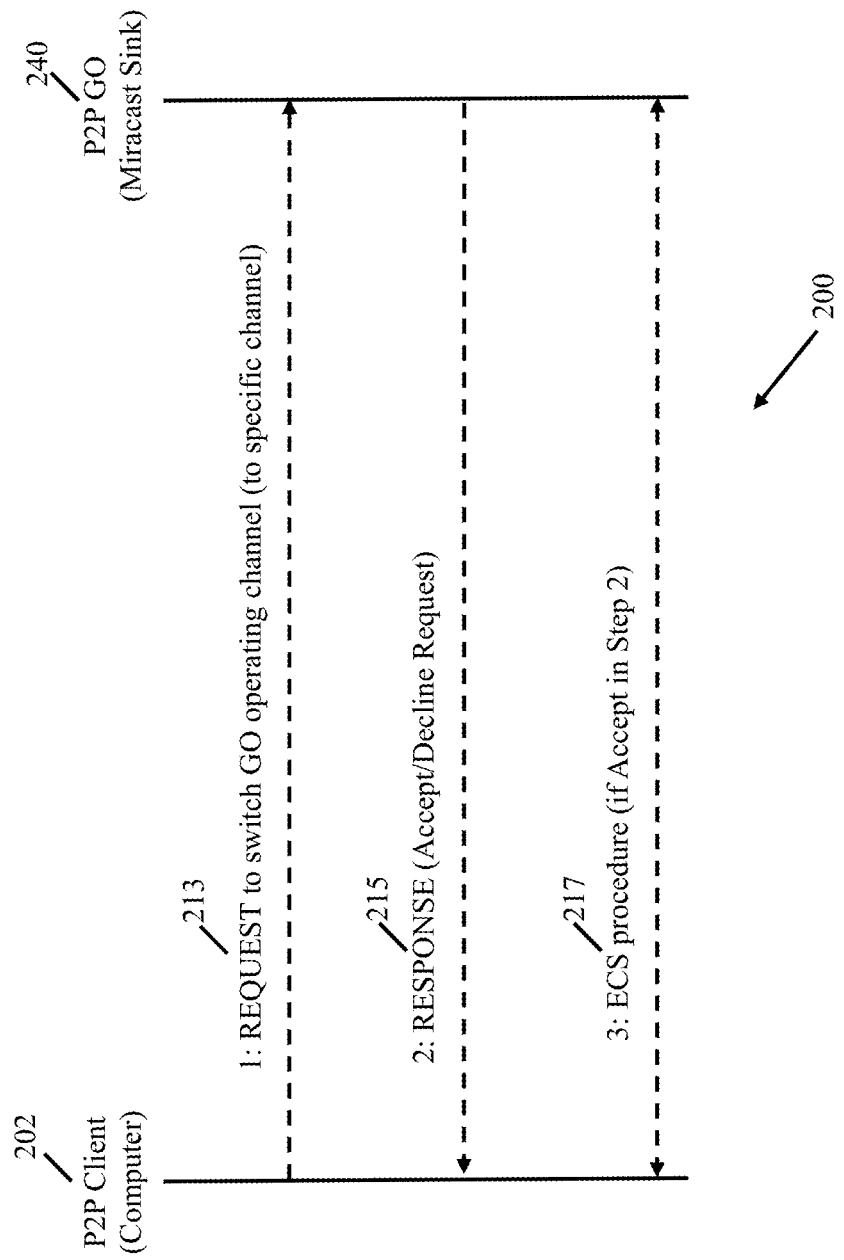
FIG. 2 is a schematic sequence diagram of operations between a Peer to Peer (P2P) client device and a P2P Group Owner (GO), in accordance with some demonstrative embodiments.

Reference is made to FIG. 2, which schematically illustrates a sequence diagram 200 of operations between a P2P client 202 and a P2P GO 240, in accordance with some demonstrative embodiments. For example, P2P client 202 may perform the functionality of device 102 (FIG. 1), and/or P2P GO 240 may perform the functionality of device 140 (FIG. 1).

As shown in FIG. 2, P2P client 202 may transmit to P2P GO 240 a request message 213 to request to switch an operating channel of P2P GO 240 to a particular channel. For example, device 102 (FIG. 1) may transmit to device 140 (FIG. 1) request 113 (FIG. 1) to request to switch to the second wireless communication channel, e.g., as described above.

As shown in FIG. 2, P2P GO 240 may transmit to P2P client 202 a response message 215 to indicate whether or not the request is accepted. For example, device 140 (FIG. 1) may transmit to device 102 (FIG. 1) response 115 (FIG. 1) to indicate whether or not the channel switch request is accepted, e.g., as described above.

As shown in FIG. 2, P2P client 202 and P2P GO 240 may perform an ECS procedure 217 to switch to the particular channel, if the request is accepted. Devices 102 and 140 (FIG. 1) may perform the ECS procedure to switch to the second wireless communication channel, e.g., as described above.

Figure 3:
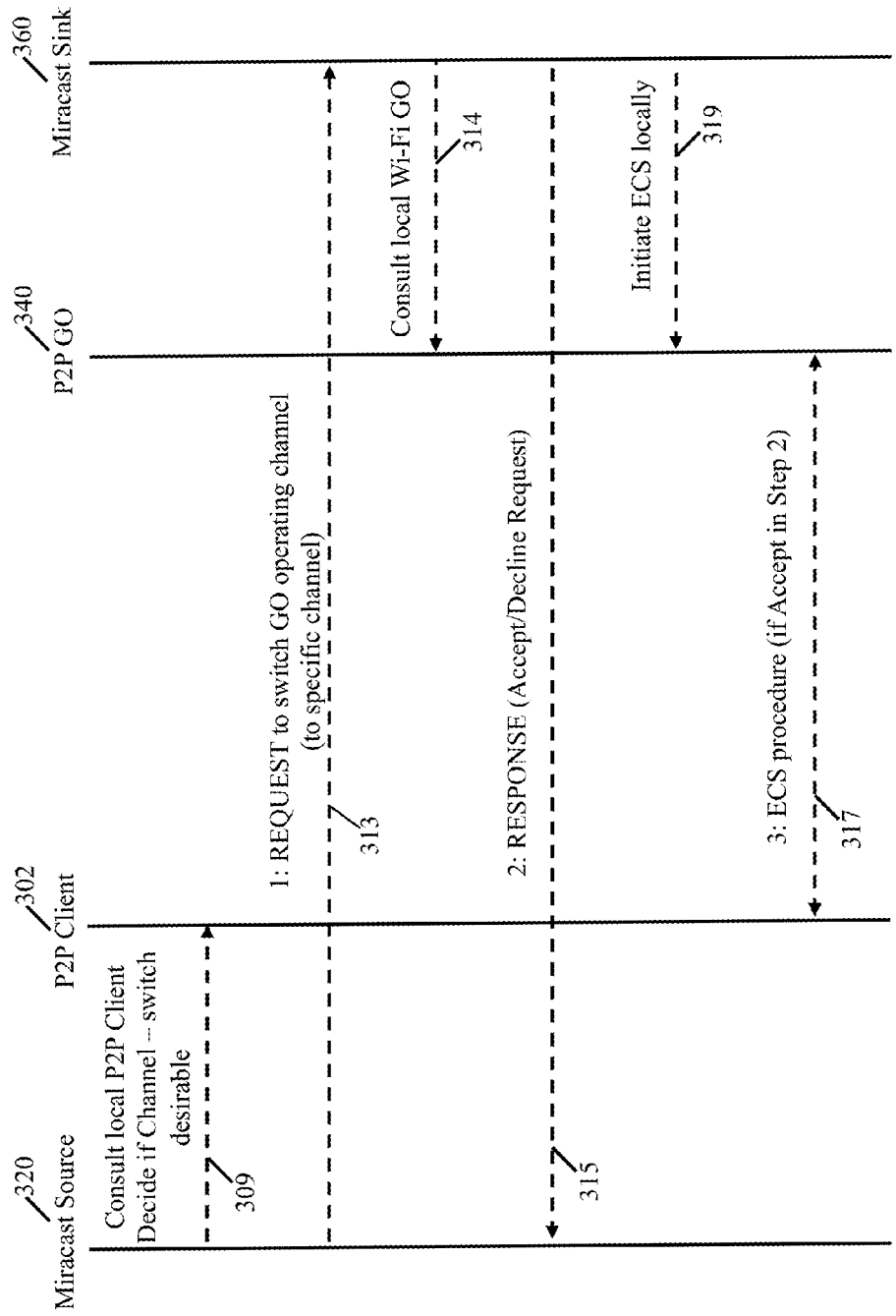
FIG. 3 is a schematic sequence diagram of operations between a P2P client device, a video source, a video sink, and a P2P GO, in accordance with some demonstrative embodiments.

Reference is made to FIG. 3, which schematically illustrates a sequence diagram 300 of operations between a P2P client 302, a P2P GO 340, a video source 320, and a video sink 360, in accordance with some demonstrative embodiments. For example, P2P client 302 may perform the functionality of device 102 (FIG. 1), P2P GO 340 may perform the functionality of device 140 (FIG. 1), video source 320 may perform the functionality of video source 120 (FIG. 1), and/or video sink 360 may perform the functionality of video sink 160 (FIG. 1).

As shown in FIG. 3, video source 320 may consult (309) with P2P client 302 to determine whether or not to request P2P GO 340 to switch a wireless communication channel. For example, controller 124 may control radio 114 (FIG. 1) to transmit request 113 (FIG. 1), based on the comparison between performance of radio 114 when operating at the SCM and when operating at the DCM, e.g., as described above.

As shown in FIG. 3, P2P client 302 may transmit to P2P GO 340 a request message 313 to request to switch an operating channel of P2P GO 340 to a particular channel. For example, device 102 (FIG. 1) may transmit request 113 (FIG. 1) to device 140 (FIG. 1) to request to switch to the second wireless communication channel, e.g., as described above.

As shown in FIG. 3, video sink 360 may consult (314) with P2P GO 340 to determine whether or not to accept the request. For example, controller 154 (FIG. 1) may determine whether or not to accept the channel switch, e.g., as described above.

As shown in FIG. 3, P2P GO 340 may transmit to P2P client 302 a response message 315 to indicate whether or not the request is accepted. For example, device 140 (FIG. 1) may transmit response 115 (FIG. 1) to device 102 (FIG. 1) to indicate whether or not the channel switch request is accepted, e.g., as described above.

As shown in FIG. 3, video sink 360 may control (319) P2P GO 340 to switch to the particular channel, e.g., if the request is accepted. For example, controller 154 (FIG. 1) may control radio 144 (FIG. 1) to switch to the second wireless communication channel, e.g., as described above.

As shown in FIG. 3, devices 302 and 340 may perform an ECS procedure 317 to switch to the particular channel, if the request is accepted. Devices 102 and 140 (FIG. 1) may perform the ECS procedure to switch to the second wireless communication channel, e.g., as described above.

Figure 4:
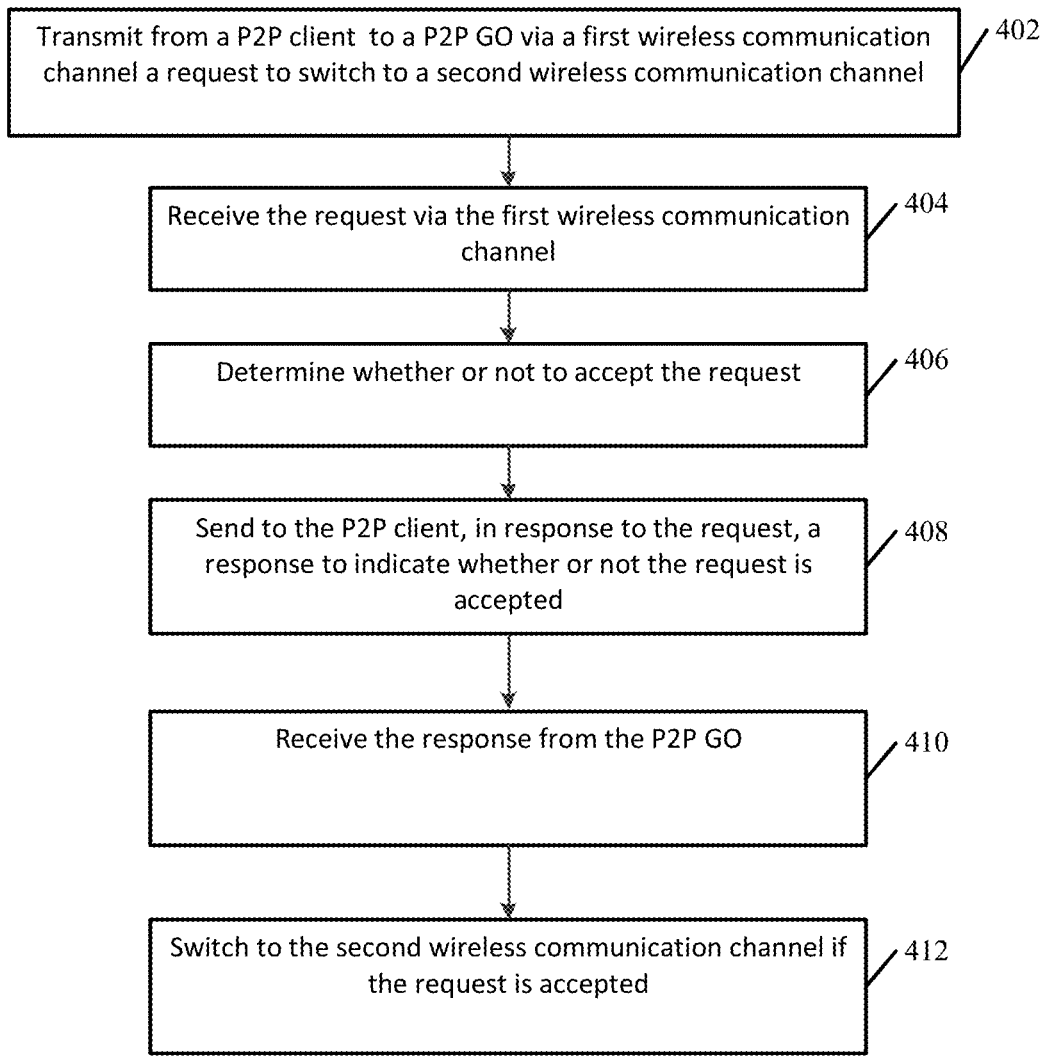
FIG. 4 is a schematic flow chart illustration of a method of channel switching, in accordance with some demonstrative embodiments.

Reference is made to FIG. 4, which schematically illustrates a method of channel switching, in accordance with some demonstrative embodiments. For example, one or more of the operations of the method of FIG. 4 may be performed by a wireless communication system, e.g., system 100 (FIG. 1); a wireless communication device, e.g., devices 102 and/or 140 (FIG. 1), a radio, e.g., radios 114 and/or 144 (FIG. 1); a video source, e.g., video source 120 (FIG. 1); a video sink, e.g., video sink 160 (FIG. 1); a message processor, e.g., message processors 128 and/or 134 (FIG. 1); and/or a controller, e.g., controllers 124 and/or 154 (FIG. 1).

As indicated at block 402, the method may include transmitting from a P2P client to a P2P GO via a first wireless communication channel a request to switch to a second wireless communication channel. For example, radio 114 (FIG. 1) may transmit request 113 (FIG. 1) via the first wireless communication channel to request to switch to the second wireless communication channel, e.g., as described above.

As indicated at block 404, the method may include receiving the request via the first wireless communication channel. For example, radio 144 (FIG. 1) may receive request 113 (FIG. 1) via the first wireless communication channel, e.g., as described above.

As indicated at block 406, the method may include determining whether or not to accept the request. For example, controller 154 (FIG. 1) may determine whether or not to accept the channel switch request, e.g., as described above.

As indicated at block 408, the method may include sending to the P2P client a response, in response to the request, to indicate whether or not the request is accepted. For example, radio 144 (FIG. 1) may transmit response 115 (FIG. 1) to indicate whether or not the channel switch request is accepted, e.g., as described above.

As indicated at block 410, the method may include receiving the response from the P2P GO. For example, radio 114 (FIG. 1) may receive response 115 (FIG. 1) from device 140 (FIG. 1), e.g., as described above.

As indicated at block 412, the method may include switching to the second wireless communication channel, if the request is accepted. For example, controller 124 (FIG. 1) may switch radio 114 (FIG. 1) to communicate over the second wireless communication channel, and/or controller 154 (FIG. 1) may switch radio 144 (FIG. 1) to communicate over the second wireless communication channel, if the channel switch request is accepted.

Figure 5:
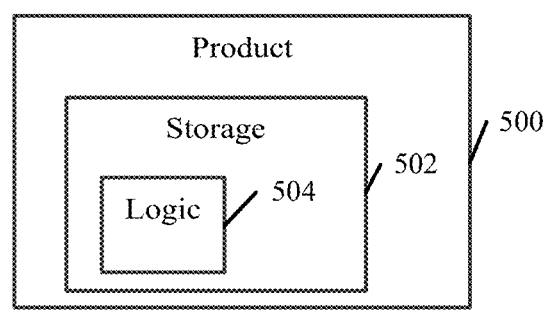
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of device 102 (FIG. 1), radio 114 (FIG. 1), video source 120 (FIG. 1), controller 124 (FIG. 1), device 140 (FIG. 1), radio 144 (FIG. 1), video sink 160 (FIG. 1), controller 154 (FIG. 1), message processors 128 and/or 134 (FIG. 1) and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a Peer to Peer (P2P) client device comprising a radio to transmit a request to a P2P Group Owner (GO) via a first wireless communication channel, the request including a request to switch to a second wireless communication channel, the radio to receive from the P2P GO a response in response to the request; and a controller to, based on the response, switch the radio to the second wireless communication channel to communicate with the P2P GO.

Example 2 includes the subject matter of Example 1, and optionally, wherein the controller is to switch the radio to the second wireless communication channel, if the response indicates the request is accepted.

Example 3 includes the subject matter of Example 1 or 2, and optionally, wherein the response includes an identifier of a wireless communication network over the first wireless communication channel, if the response indicates the request is not accepted.

Example 4 includes the subject matter of Example 3, and optionally, wherein the controller is to cause the radio to roam to the wireless communication network over the first wireless communication channel.

Example 5 includes the subject matter of Example 3, and optionally, wherein the identifier includes a Basic Service Set Identification (BSSID) of the wireless communication network.

Example 6 includes the subject matter of any one of Examples 1-5, and optionally, wherein, prior to transmitting the request, the radio is to communicate with one or more wireless communication devices via the second wireless communication channel.

Example 7 includes the subject matter of Example 1, and optionally, wherein the controller is to control the radio to transmit the request, based on a comparison between communication at a Same Channel Mode (SCM) and communication at a Different Channel Mode (DCM).

Example 8 includes the subject matter of Example 7, and optionally, wherein the SCM includes a mode in which the radio is to communicate via the second wireless communication channel with the one or more wireless communication devices and the P2P GO; and the DCM includes a mode in which the radio is to communicate with the one or more wireless communication devices via the second wireless communication channel, and to communicate with the P2P GO via the first wireless communication channel.

Example 9 includes the subject matter of any one of Examples 1-8, and optionally, wherein the request includes a request to initiate an Extended Channel Switch (ECS) procedure.

Example 10 includes the subject matter of any one of Examples 1-9, and optionally, wherein the request is included in an Information Element (IE) of a probe request frame, and the response is included in an IE of a probe response frame.

Example 11 includes the subject matter of any one of Examples 1-9, and optionally, wherein at least one message selected from the group consisting of the request and the response is included in at least one Information Element (IE) of a P2P action frame.

Example 12 includes the subject matter of any one of Examples 1-9, and optionally, wherein the radio is to stream media content from a video source to a video sink, and wherein at least one message selected from the group consisting of the request and the response is encapsulated in a message communicated between the video source and the video sink.

Example 13 includes the subject matter of any one of Examples 1-12, and optionally, comprising a video source.

Example 14 includes the subject matter of Example 13, and optionally, wherein the video source comprises a Miracast video source.

Example 15 includes a Peer to Peer (P2P) Group Owner (GO) device comprising a radio to receive from a P2P client via a first wireless communication channel a request to switch to a second wireless communication channel, and to send to the P2P client a response in response to the request, the response indicates whether or not the request is accepted; and a controller to determine whether or not to accept the request, and to switch the radio to the second wireless communication channel if the request is accepted.

Example 16 includes the subject matter of Example 15, and optionally, wherein the controller is to initiate an Extended Channel Switch (ECS) procedure to switch the radio to the second wireless communication channel.

Example 17 includes the subject matter of Example 15 or 16, and optionally, wherein the radio is to communicate with one or more wireless communication devices via the first wireless communication channel, the controller is to switch the radio to communicate with the one or more wireless communication devices via the second wireless communication channel.

Example 18 includes the subject matter of Example 17, and optionally, wherein the controller is to initiate an Extended Channel Switch (ECS) procedure with the one or more wireless communication devices.

Example 19 includes the subject matter of Example 15, and optionally, wherein the response includes an identifier of a wireless communication network over the first wireless communication channel, if the request is not accepted.

Example 20 includes the subject matter of Example 19, and optionally, wherein the identifier includes a Basic Service Set Identification (BSSID) of the wireless communication network.

Example 21 includes the subject matter of any one of Examples 15-20, and optionally, wherein the request is included in an Information Element (IE) of a probe request frame, and the response is included in an IE of a probe response frame.

Example 22 includes the subject matter of any one of Examples 15-20, and optionally, wherein at least one message selected from the group consisting of the request and the response is included in at least one Information Element (IE) of P2P action frame.

Example 23 includes the subject matter of any one of Examples 15-20, and optionally, wherein the radio is to stream media content from a video source to a video sink, and wherein at least one message selected from the group consisting of the request and the response is encapsulated in a message communicated between the video source and the video sink.

Example 24 includes the subject matter of Example 23, and optionally, comprising a video sink.

Example 25 includes the subject matter of Example 24, and optionally, wherein the video sink comprises a Miracast sink.

Example 26 includes a system including a Peer to Peer (P2P) client device, the P2P client device comprising one or more antennas; a memory; a processor; a radio to transmit a request to a P2P Group Owner (GO) via a first wireless communication channel, the request including a request to switch to a second wireless communication channel, the radio to receive from the P2P GO a response in response to the request; and a controller to, based on the response, switch the radio to the second wireless communication channel to communicate with the P2P GO.

Example 27 includes the subject matter of Example 26, and optionally, wherein the controller is to switch the radio to the second wireless communication channel, if the response indicates the request is accepted.

Example 28 includes the subject matter of Example 26 or 27, and optionally, wherein the response includes an identifier of a wireless communication network over the first wireless communication channel, if the response indicates the request is not accepted.

Example 29 includes the subject matter of Example 28, and optionally, wherein the controller is to cause the radio to roam to the wireless communication network over the first wireless communication channel.

Example 30 includes the subject matter of Example 28, and optionally, wherein the identifier includes a Basic Service Set Identification (BSSID) of the wireless communication network.

Example 31 includes the subject matter of any one of Examples 26-30, and optionally, wherein, prior to transmitting the request, the radio is to communicate with one or more wireless communication devices via the second wireless communication channel.

Example 32 includes the subject matter of Example 26, and optionally, wherein the controller is to control the radio to transmit the request, based on a comparison between communication at a Same Channel Mode (SCM) and communication at a Different Channel Mode (DCM).

Example 33 includes the subject matter of Example 32, and optionally, wherein the SCM includes a mode in which the radio is to communicate via the second wireless communication channel with the one or more wireless communication devices and the P2P GO; and the DCM includes a mode in which the radio is to communicate with the one or more wireless communication devices via the second wireless communication channel, and to communicate with the P2P GO via the first wireless communication channel.

Example 34 includes the subject matter of any one of Examples 26-33, and optionally, wherein the request includes a request to initiate an Extended Channel Switch (ECS) procedure.

Example 35 includes the subject matter of any one of Examples 26-34, and optionally, wherein the request is included in an Information Element (IE) of a probe request frame, and the response is included in an IE of a probe response frame.

Example 36 includes the subject matter of any one of Examples 26-34, and optionally, wherein at least one message selected from the group consisting of the request and the response is included in at least one Information Element (IE) of a P2P action frame.

Example 37 includes the subject matter of any one of Examples 26-34, and optionally, wherein the radio is to stream media content from a video source to a video sink, and wherein at least one message selected from the group consisting of the request and the response is encapsulated in a message communicated between the video source and the video sink.

Example 38 includes the subject matter of any one of Examples 26-37, and optionally, wherein the P2P client device comprises a video source.

Example 39 includes the subject matter of Example 38, and optionally, wherein the video source comprises a Miracast video source.

Example 40 includes a system including a Peer to Peer (P2P) Group Owner (GO) device, the P2P GO device comprising one or more antennas; a memory; a processor; a radio to receive from a P2P client a request via a first wireless communication channel to switch to a second wireless communication channel, and to send to the P2P client a response in response to the request, the response indicates whether or not the request is accepted; and a controller to determine whether or not to accept the request, and to switch the radio to the second wireless communication channel if the request is accepted.

Example 41 includes the subject matter of Example 40, and optionally, wherein the controller is to initiate an Extended Channel Switch (ECS) procedure to switch the radio to the second wireless communication channel.

Example 42 includes the subject matter of Example 40 or 41, and optionally, wherein the radio is to communicate with one or more wireless communication devices via the first wireless communication channel, the controller is to switch the radio to communicate with the one or more wireless communication devices via the second wireless communication channel.

Example 43 includes the subject matter of Example 42, and optionally, wherein the controller is to initiate an Extended Channel Switch (ECS) procedure with the one or more wireless communication devices.

Example 44 includes the subject matter of Example 40, and optionally, wherein the response includes an identifier of a wireless communication network over the first wireless communication channel, if the request is not accepted.

Example 45 includes the subject matter of Example 44, and optionally, wherein the identifier includes a Basic Service Set Identification (BSSID) of the wireless communication network.

Example 46 includes the subject matter of any one of Examples 40-45, and optionally, wherein the request is included in an Information Element (IE) of a probe request frame, and the response is included in an IE of a probe response frame.

Example 47 includes the subject matter of any one of Examples 40-45, and optionally, wherein at least one message selected from the group consisting of the request and the response is included in at least one Information Element (IE) of P2P action frame.

Example 48 includes the subject matter of any one of Examples 40-45, and optionally, wherein the radio is to stream media content from a video source to a video sink, and wherein at least one message selected from the group consisting of the request and the response is encapsulated in a message communicated between the video source and the video sink.

Example 49 includes the subject matter of Example 48, and optionally, wherein the P2P GO comprises a video sink.

Example 50 includes the subject matter of Example 49, and optionally, wherein the video sink comprises a Miracast sink.

Example 51 includes a method to be performed at a Peer to Peer (P2P) client device, the method comprising transmitting a request to a P2P Group Owner (GO) via a first wireless communication channel, the request including a request to switch to a second wireless communication channel; receiving from the P2P GO a response in response to the request; and based on the response, switching to the second wireless communication channel to communicate with the P2P GO.

Example 52 includes the subject matter of Example 51, and optionally, comprising switching to the second wireless communication channel, if the response indicates the request is accepted.

Example 53 includes the subject matter of Example 51 or 52, and optionally, wherein the response includes an identifier of a wireless communication network over the first wireless communication channel, if the response indicates the request is not accepted.

Example 54 includes the subject matter of Example 53, and optionally, comprising roaming to the wireless communication network over the first wireless communication channel.

Example 55 includes the subject matter of Example 53, and optionally, wherein the identifier includes a Basic Service Set Identification (BSSID) of the wireless communication network.

Example 56 includes the subject matter of any one of Examples 51-55, and optionally, comprising, prior to transmitting the request, communicating with one or more wireless communication devices via the second wireless communication channel.

Example 57 includes the subject matter of Example 51, and optionally, comprising transmitting the request, based on a comparison between communication at a Same Channel Mode (SCM) and communication at a Different Channel Mode (DCM).

Example 58 includes the subject matter of Example 57, and optionally, wherein the SCM includes communication via the second wireless communication channel with the one or more wireless communication devices and the P2P GO; and the DCM includes communication with the one or more wireless communication devices via the second wireless communication channel, and communication with the P2P GO via the first wireless communication channel.

Example 59 includes the subject matter of any one of Examples 51-58, and optionally, wherein the request includes a request to initiate an Extended Channel Switch (ECS) procedure.

Example 60 includes the subject matter of any one of Examples 51-59, and optionally, wherein the request is included in an Information Element (IE) of a probe request frame, and the response is included in an IE of a probe response frame.

Example 61 includes the subject matter of any one of Examples 51-59, and optionally, wherein at least one message selected from the group consisting of the request and the response is included in at least one Information Element (IE) of a P2P action frame.

Example 62 includes the subject matter of any one of Examples 51-59, and optionally, comprising streaming media content from a video source to a video sink, and wherein at least one message selected from the group consisting of the request and the response is encapsulated in a message communicated between the video source and the video sink.

Example 63 includes the subject matter of any one of Examples 51-62, and optionally, wherein the P2P client device comprises a video source.

Example 64 includes the subject matter of Example 63, and optionally, wherein the video source comprises a Miracast video source.

Example 65 includes a method to be performed at a Peer to Peer (P2P) Group Owner (GO) device, the method comprising receiving from a P2P client a request via a first wireless communication channel to switch to a second wireless communication channel; determining whether or not to accept the request; sending to the P2P client a response in response to the request, the response indicates whether or not the request is accepted; and switching to the second wireless communication channel if the request is accepted.

Example 66 includes the subject matter of Example 65, and optionally, comprising initiating an Extended Channel Switch (ECS) procedure to switch to the second wireless communication channel.

Example 67 includes the subject matter of Example 65 or 66, and optionally, comprising communicating with one or more wireless communication devices via the first wireless communication channel, and switching to communicate with the one or more wireless communication devices via the second wireless communication channel.

Example 68 includes the subject matter of Example 67, and optionally, comprising initiating an Extended Channel Switch (ECS) procedure with the one or more wireless communication devices.

Example 69 includes the subject matter of Example 65, and optionally, wherein the response includes an identifier of a wireless communication network over the first wireless communication channel, if the request is not accepted.

Example 70 includes the subject matter of Example 69, and optionally, wherein the identifier includes a Basic Service Set Identification (BSSID) of the wireless communication network.

Example 71 includes the subject matter of any one of Examples 65-70, and optionally, wherein the request is included in an Information Element (IE) of a probe request frame, and the response is included in an IE of a probe response frame.

Example 72 includes the subject matter of any one of Examples 65-70, and optionally, wherein at least one message selected from the group consisting of the request and the response is included in at least one Information Element (IE) of P2P action frame.

Example 73 includes the subject matter of any one of Examples 65-70, and optionally, comprising streaming media content from a video source to a video sink, and wherein at least one message selected from the group consisting of the request and the response is encapsulated in a message communicated between the video source and the video sink.

Example 74 includes the subject matter of Example 73, and optionally, wherein the P2P GO device comprises a video sink.

Example 75 includes the subject matter of Example 74, and optionally, wherein the video sink comprises a Miracast sink.

Example 76 includes a product including one or more tangible computer-readable non-transitory storage media comprising computer-executable instructions operable to, when executed by at least one computer processor, enable the at least one computer processor to implement a method at a Peer to Peer (P2P) client device, the method comprising transmitting a request to a P2P Group Owner (GO) via a first wireless communication channel, the request including a request to switch to a second wireless communication channel; receiving from the P2P GO a response in response to the request; and based on the response, switching to the second wireless communication channel to communicate with the P2P GO.

Example 77 includes the subject matter of Example 76, and optionally, wherein the method comprises switching to the second wireless communication channel, if the response indicates the request is accepted.

Example 78 includes the subject matter of Example 76 or 77, and optionally, wherein the response includes an identifier of a wireless communication network over the first wireless communication channel, if the response indicates the request is not accepted.

Example 79 includes the subject matter of Example 78, and optionally, wherein the method comprises roaming to the wireless communication network over the first wireless communication channel.

Example 80 includes the subject matter of Example 78, and optionally, wherein the identifier includes a Basic Service Set Identification (BSSID) of the wireless communication network.

Example 81 includes the subject matter of any one of Examples 76-80, and optionally, wherein the method comprises, prior to transmitting the request, communicating with one or more wireless communication devices via the second wireless communication channel.

Example 82 includes the subject matter of Example 76, and optionally, wherein the method comprises transmitting the request, based on a comparison between communication at a Same Channel Mode (SCM) and communication at a Different Channel Mode (DCM).

Example 83 includes the subject matter of Example 82, and optionally, wherein the SCM includes communication via the second wireless communication channel with the one or more wireless communication devices and the P2P GO; and the DCM includes communication with the one or more wireless communication devices via the second wireless communication channel, and communication with the P2P GO via the first wireless communication channel.

Example 84 includes the subject matter of any one of Examples 76-83, and optionally, wherein the request includes a request to initiate an Extended Channel Switch (ECS) procedure.

Example 85 includes the subject matter of any one of Examples 76-84, and optionally, wherein the request is included in an Information Element (IE) of a probe request frame, and the response is included in an IE of a probe response frame.

Example 86 includes the subject matter of any one of Examples 76-84, and optionally, wherein at least one message selected from the group consisting of the request and the response is included in at least one Information Element (IE) of a P2P action frame.

Example 87 includes the subject matter of any one of Examples 76-84, and optionally, wherein the method comprises streaming media content from a video source to a video sink, and wherein at least one message selected from the group consisting of the request and the response is encapsulated in a message communicated between the video source and the video sink.

Example 88 includes the subject matter of any one of Examples 76-87, and optionally, wherein the P2P client device comprises a video source.

Example 89 includes the subject matter of Example 88, and optionally, wherein the video source comprises a Miracast video source.

Example 90 includes a product including one or more tangible computer-readable non-transitory storage media comprising computer-executable instructions operable to, when executed by at least one computer processor, enable the at least one computer processor to implement a method at a Peer to Peer (P2P) Group Owner (GO) device, the method comprising receiving from a P2P client a request via a first wireless communication channel to switch to a second wireless communication channel; determining whether or not to accept the request; sending to the P2P client a response in response to the request, the response indicates whether or not the request is accepted; and switching to the second wireless communication channel if the request is accepted.

Example 91 includes the subject matter of Example 90, and optionally, wherein the method comprises initiating an Extended Channel Switch (ECS) procedure to switch to the second wireless communication channel.

Example 92 includes the subject matter of Example 90 or 91, and optionally, wherein the method comprises communicating with one or more wireless communication devices via the first wireless communication channel, and switching to communicate with the one or more wireless communication devices via the second wireless communication channel.

Example 93 includes the subject matter of Example 92, and optionally, wherein the method comprises initiating an Extended Channel Switch (ECS) procedure with the one or more wireless communication devices.

Example 94 includes the subject matter of Example 90, and optionally, wherein the response includes an identifier of a wireless communication network over the first wireless communication channel, if the request is not accepted.

Example 95 includes the subject matter of Example 94, and optionally, wherein the identifier includes a Basic Service Set Identification (BSSID) of the wireless communication network.

Example 96 includes the subject matter of any one of Examples 90-95, and optionally, wherein the request is included in an Information Element (IE) of a probe request frame, and the response is included in an IE of a probe response frame.

Example 97 includes the subject matter of any one of Examples 90-95, and optionally, wherein at least one message selected from the group consisting of the request and the response is included in at least one Information Element (IE) of P2P action frame.

Example 98 includes the subject matter of any one of Examples 90-95, and optionally, wherein the method comprises streaming media content from a video source to a video sink, and wherein at least one message selected from the group consisting of the request and the response is encapsulated in a message communicated between the video source and the video sink.

Example 99 includes the subject matter of Example 98, and optionally, wherein the P2P GO device comprises a video sink.

Example 100 includes the subject matter of Example 99, and optionally, wherein the video sink comprises a Miracast sink.

Example 101 includes an apparatus comprising means for transmitting a request from a Peer to Peer (P2P) client device to a P2P Group Owner (GO) via a first wireless communication channel, the request including a request to switch to a second wireless communication channel; means for receiving from the P2P GO a response in response to the request; and means for, based on the response, switching to the second wireless communication channel to communicate with the P2P GO.

Example 102 includes the subject matter of Example 101, and optionally, comprising means for switching to the second wireless communication channel, if the response indicates the request is accepted.

Example 103 includes the subject matter of Example 101 or 102, and optionally, wherein the response includes an identifier of a wireless communication network over the first wireless communication channel, if the response indicates the request is not accepted.

Example 104 includes the subject matter of Example 103, and optionally, comprising means for roaming to the wireless communication network over the first wireless communication channel.

Example 105 includes the subject matter of Example 103, and optionally, wherein the identifier includes a Basic Service Set Identification (BSSID) of the wireless communication network.

Example 106 includes the subject matter of any one of Examples 101-105, and optionally, comprising means for, prior to transmitting the request, communicating with one or more wireless communication devices via the second wireless communication channel.

Example 107 includes the subject matter of Example 101, and optionally, comprising means for transmitting the request, based on a comparison between communication at a Same Channel Mode (SCM) and communication at a Different Channel Mode (DCM).

Example 108 includes the subject matter of Example 107, and optionally, wherein the SCM includes communication via the second wireless communication channel with the one or more wireless communication devices and the P2P GO; and the DCM includes communication with the one or more wireless communication devices via the second wireless communication channel, and communication with the P2P GO via the first wireless communication channel.

Example 109 includes the subject matter of any one of Examples 101-108, and optionally, wherein the request includes a request to initiate an Extended Channel Switch (ECS) procedure.

Example 110 includes the subject matter of any one of Examples 101-109, and optionally, wherein the request is included in an Information Element (IE) of a probe request frame, and the response is included in an IE of a probe response frame.

Example 111 includes the subject matter of any one of Examples 101-109, and optionally, wherein at least one message selected from the group consisting of the request and the response is included in at least one Information Element (IE) of a P2P action frame.

Example 112 includes the subject matter of any one of Examples 101-109, and optionally, comprising means for streaming media content from a video source to a video sink, and wherein at least one message selected from the group consisting of the request and the response is encapsulated in a message communicated between the video source and the video sink.

Example 113 includes the subject matter of any one of Examples 101-112, and optionally, wherein the P2P client device comprises a video source.

Example 114 includes the subject matter of Example 113, and optionally, wherein the video source comprises a Miracast video source.

Example 115 includes an apparatus comprising means for receiving at a Peer to Peer (P2P) Group Owner (GO) device a request from a P2P client via a first wireless communication channel to switch to a second wireless communication channel; means for determining whether or not to accept the request; means for sending to the P2P client a response in response to the request, the response indicates whether or not the request is accepted; and means for switching to the second wireless communication channel if the request is accepted.

Example 116 includes the subject matter of Example 115, and optionally, comprising means for initiating an Extended Channel Switch (ECS) procedure to switch to the second wireless communication channel.

Example 117 includes the subject matter of Example 115 or 116, and optionally, comprising means for communicating with one or more wireless communication devices via the first wireless communication channel, and means for switching to communicate with the one or more wireless communication devices via the second wireless communication channel.

Example 118 includes the subject matter of Example 117, and optionally, comprising means for initiating an Extended Channel Switch (ECS) procedure with the one or more wireless communication devices.

Example 119 includes the subject matter of Example 115, and optionally, wherein the response includes an identifier of a wireless communication network over the first wireless communication channel, if the request is not accepted.

Example 120 includes the subject matter of Example 119, and optionally, wherein the identifier includes a Basic Service Set Identification (BSSID) of the wireless communication network.

Example 121 includes the subject matter of any one of Examples 115-120, and optionally, wherein the request is included in an Information Element (IE) of a probe request frame, and the response is included in an IE of a probe response frame.

Example 122 includes the subject matter of any one of Examples 115-120, and optionally, wherein at least one message selected from the group consisting of the request and the response is included in at least one Information Element (IE) of P2P action frame.

Example 123 includes the subject matter of any one of Examples 115-120, and optionally, comprising means for streaming media content from a video source to a video sink, and wherein at least one message selected from the group consisting of the request and the response is encapsulated in a message communicated between the video source and the video sink.

Example 124 includes the subject matter of Example 123, and optionally, wherein the P2P GO device comprises a video sink.

Example 125 includes the subject matter of Example 124, and optionally, wherein the video sink comprises a Miracast sink.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A Peer to Peer (P2P) client device comprising:
a radio to transmit a request to a P2P Group Owner (GO) via a first wireless communication channel, said request including an Information Element (IE) configured to request the P2P GO to initiate an Extended Channel Switch (ECS) procedure to switch to a second wireless communication channel, said radio to receive from said P2P GO a response in response to said request; and
a controller to, based on said response, switch said radio to said second wireless communication channel to communicate with said P2P GO.

2. The P2P client device of claim 1, wherein said controller is to switch said radio to said second wireless communication channel, if said response indicates said request is accepted.

3. The P2P client device of claim 1, wherein said response includes an identifier of a wireless communication network over said first wireless communication channel, if said response indicates said request is not accepted.

4. A Peer to Peer (P2P) client device comprising:
a radio to transmit a request to a P2P Group Owner (GO) via a first wireless communication channel, said request including a request to switch to a second wireless communication channel, said radio to receive from said P2P GO a response in response to said request, said response including an identifier of a wireless communication network, which includes the P2P GO, over said first wireless communication channel, if said response indicates said request is not accepted; and a controller to, based on said response, cause said radio to roam to said wireless communication network over said first wireless communication channel.

5. The P2P client device of claim 3, wherein said identifier includes a Basic Service Set Identification (BSSID) of said wireless communication network.

6. A Peer to Peer (P2P) client device comprising:
a radio to transmit a request to a P2P Group Owner (GO) via a first wireless communication channel, said request including a request to switch to a second wireless communication channel, said radio to receive from said P2P GO a response in response to said request, wherein, prior to transmitting said request, said radio is to communicate with one or more wireless communication devices via said second wireless communication channel; and
a controller to, based on said response, switch said radio to said second wireless communication channel to communicate with said P2P GO.

7. A Peer to Peer (P2P) client device comprising:
a radio to transmit a request to a P2P Group Owner (GO) via a first wireless communication channel, said request including a request to switch to a second wireless communication channel, said radio to receive from said P2P GO a response in response to said request; and
a controller to control said radio to transmit said request, based on a comparison between communication at a Same Channel Mode (SCM) and communication at a Different Channel Mode (DCM), the controller to, based on said response, switch said radio to said second wireless communication channel to communicate with said P2P GO.

8. The P2P client device of claim 7, wherein said SCM includes a mode in which said radio is to communicate via said second wireless communication channel with one or more wireless communication devices and said P2P GO; and said DCM includes a mode in which said radio is to communicate with said one or more wireless communication devices via said second wireless communication channel, and to communicate with said P2P GO via said first wireless communication channel.

9. The P2P client device of claim 6, wherein said request includes a request to initiate an Extended Channel Switch (ECS) procedure.

10. A Peer to Peer (P2P) client device comprising:
a radio to transmit a request to a P2P Group Owner (GO) via a first wireless communication channel, said request including a request to switch to a second wireless communication channel, said radio to receive from said P2P GO a response in response to said request, wherein said request is included in an Information Element (IE) of a probe request frame, and said response is included in an IE of a probe response frame; and
a controller to, based on said response, switch said radio to said second wireless communication channel to communicate with said P2P GO.

11. The P2P client device of claim 4, wherein at least one message selected from the group consisting of said request and said response is included in at least one Information Element (IE) of a P2P action frame.

12. A Peer to Peer (P2P) client device comprising:
a radio to stream media content from a video source to a video sink, said radio to transmit a request to a P2P Group Owner (GO) via a first wireless communication channel, said request including a request to switch to a second wireless communication channel, said radio to receive from said P2P GO a response in response to said request, wherein at least one message selected from the group consisting of said request and said response is encapsulated in a message communicated between said video source and said video sink; and
a controller to, based on said response, switch said radio to said second wireless communication channel to communicate with said P2P GO.

13. The P2P client device of claim 10 comprising:
one or more antennas;
a memory;
a processor; and
a video source.

14. A Peer to Peer (P2P) Group Owner (GO) device comprising:
a radio to receive from a P2P client via a first wireless communication channel a request to switch to a second wireless communication channel, said request including an Information Element (IE) configured to request the P2P GO to initiate an Extended Channel Switch (ECS) procedure, said radio to send to said P2P client a response in response to said request, said response indicates whether or not said request is accepted; and
a controller to determine whether or not to accept the request, and to initiate the ECS procedure to switch said radio to said second wireless communication channel if said request is accepted.

15. The P2P GO device of claim 14, wherein said radio is to communicate with one or more wireless communication devices via said first wireless communication channel, said controller is to switch said radio to communicate with said one or more wireless communication devices via said second wireless communication channel.

16. The P2P GO device of claim 15, wherein said controller is to initiate said ECS procedure with said one or more wireless communication devices.

17. The P2P GO device of claim 14, wherein said response includes an identifier of a wireless communication network, which includes the P2P GO, over said first wireless communication channel, if said request is not accepted.

18. The P2P GO device of claim 14 comprising:
one or more antennas;
a memory;
a processor; and
a video sink.

19. A product including one or more tangible computer-readable non-transitory storage media comprising computer-executable instructions operable to, when executed by at least one computer processor, enable the at least one computer processor to implement operations at a Peer to Peer (P2P) client device, the operations comprising:
transmitting a request to a P2P Group Owner (GO) via a first wireless communication channel, said request including an Information Element (IE) configured to request the P2P GO to initiate an Extended Channel Switch (ECS) procedure to switch to a second wireless communication channel;
receiving from said P2P GO a response in response to said request; and
based on said response, switching to said second wireless communication channel to communicate with said P2P GO.

20. The product of claim 19, wherein said operations comprise switching to said second wireless communication channel, if said response indicates said request is accepted.

21. The product of claim 19, wherein said response includes an identifier of a wireless communication network, which includes the P2P GO, over said first wireless communication channel, if said response indicates said request is not accepted.

22. A product including one or more tangible computer-readable non-transitory storage media comprising computer-executable instructions operable to, when executed by at least one computer processor, enable the at least one computer processor to implement operations at a Peer to Peer (P2P) Group Owner (GO) device, the operations comprising:

receiving from a P2P client a request via a first wireless communication channel to switch to a second wireless communication channel, said request including an Information Element (IE) configured to request the P2P GO to initiate an Extended Channel Switch (ECS) procedure;

determining whether or not to accept the request;

sending to said P2P client a response in response to said request, said response indicates whether or not said request is accepted; and initiating the ECS procedure to switch to said second wireless communication channel if said request is accepted.

23. The product of claim 22, wherein said response includes an identifier of a wireless communication network, which includes the P2P GO, over said first wireless communication channel, if said request is not accepted.

24. The product of claim 22, wherein said operations comprise communicating with one or more wireless communication devices via said first wireless communication channel, and switching to communicate with said one or more wireless communication devices via said second wireless communication channel.

* * * * *